United States Patent [19]

Lewis

[11] Patent Number: 4,554,719

[45] Date of Patent: Nov. 26, 1985

[54] MACHINE AND METHOD FOR THE MANUFACTURE OF AN AIR-TO-AIR HEAT EXCHANGER

[75] Inventor: James H. Lewis, London, Canada

[73] Assignee: Nutech Energy Systems, Inc., Exeter, Canada

[21] Appl. No.: 481,244

[22] Filed: Apr. 1, 1983

[51] Int. Cl.[4] ............................................. B23P 15/26
[52] U.S. Cl. ......................... 29/157.3 R; 29/157.3 D; 29/727; 29/509; 220/67
[58] Field of Search ......................... 165/166, 167, 170; 413/27, 4; 220/67; 29/505, 509, 157.3 R, 157.3 D, 727, 726, 283, 243.5; 72/210, 211

[56] References Cited

U.S. PATENT DOCUMENTS

| | | | |
|---|---|---|---|
| 2,846,197 | 8/1958 | Berg et al. | 165/166 X |
| 3,274,672 | 9/1966 | Dore | 29/157.3 D |
| 3,528,167 | 9/1970 | Lipp | 29/509 |
| 3,813,752 | 6/1974 | Bemrose et al. | 29/157.3 D X |
| 4,327,803 | 5/1982 | Mullejans et al. | 165/166 |

FOREIGN PATENT DOCUMENTS

0747594 7/1980 U.S.S.R. ...................... 29/157.3 D

*Primary Examiner*—Howard N. Goldberg
*Assistant Examiner*—John T. Burtch

[57] ABSTRACT

A heat exchanger for transferring heat from stale air evacuated from a building to incoming fresh air employs a core made of a stack of spaced aluminum sheets that are joined along opposite edges in an alternate arrangement to define two separate sets of air passages for the respective outgoing and incoming flows, while providing good thermal contact between the two flows. This contact is improved by generating a measure of turbulence in the air flows by forming the sheets with surface nodules. The core is mounted in a frame that can be readily slid into a housing containing fans for generating the air flows. In an alternative construction, each air flow can be caused to travel in series through two parts of each set of air passages, rather than in parallel. This series arrangement has the advantage of reducing the temperature drop across any one part of the core below the total temperature difference between the inside and outside of the building. A machine is also disclosed for manufacturing such a core. It employs sliding tools for quickly forming lap joints between adjacent sheets to space them apart and form the sides of the air passages.

8 Claims, 35 Drawing Figures

MACHINE AND METHOD FOR THE MANUFACTURE OF AN AIR-TO-AIR HEAT EXCHANGER

FIELD OF THE INVENTION

This invention relates to heat exchangers for transferring heat from one air flow to another, to cores for such heat exchangers and to a machine and a method for manufacturing such cores.

BACKGROUND TO THE INVENTION

The modern trend in the construction of buildings is to make them more and more air tight, in order to be able to achieve better control over the interior environment, particularly the temperature and humidity thereof. However, utilisation of oxygen by inhabitants of the building and other factors rendering the air stale, such as noxious gases given off by furnishing or odours generated in kitchens or bathrooms, usually necessitate the building being provided with some form of ventilation, preferably forced ventilation. If stale air is to be evacuated from the building, it must be replaced by fresh air coming in from the exterior. In those regions of the world experiencing cold winters, such incoming fresh air is often much colder than the stale air being evacuated, a fact that places an added burden on the building's heating system. The need to heat the incoming air up to the interior temperature may involve heating it as much as 20° to 40° C. Evacuation of the stale air at a relatively elevated temperature clearly represents a major waste of heat.

For these reasons, heat exchangers have been developed for the purpose of transferring at least some of the heat in the stale air as it leaves the building to the colder incoming fresh air. This diminishes the extent to which further heat needs to be supplied to the fresh air by the heating system of the building and generally renders the entire heating operation more efficient.

In this connection, it should be explained that the term "building" will be used herein for convenience to refer to any space that is required to be force ventilated, whether it be a large multi-unit building, an individual apartment or other subdivision of a larger building, a house, warehouse, shop, store or even a moving structure such as a ship, train or the like. The present invention is applicable to any such structures that are provided with forced ventilation and internal heating (or cooling) to maintain a temperature difference between the interior and the exterior. The foregoing reference to cooling envisages use of a heat exchanger according to the present invention to employ air evacuated from an air conditioned space to precool hotter incoming air.

SUMMARY OF THE INVENTION

The invention is directed towards a number of objectives in providing improvements in this art.

Firstly, the invention provides an improved core for use in a heat exchanger of the type referred to above.

Secondly, the invention provides an improved machine and method for making such a core.

Finally, the invention relates also to heat exchangers themselves incorporating such cores and employing them in improved ways.

To enable the various aspects of the present invention to be understood, embodiments thereof are described below in association with the accompanying drawings. These embodiments are set forth merely by way of example, however, and it is to be understood that the invention in its broad scope is not limited to the specific details thereof, but only as defined in the appended claims.

DESCRIPTION OF THE PREFERRED EMBODIMENTS

Figure 1:
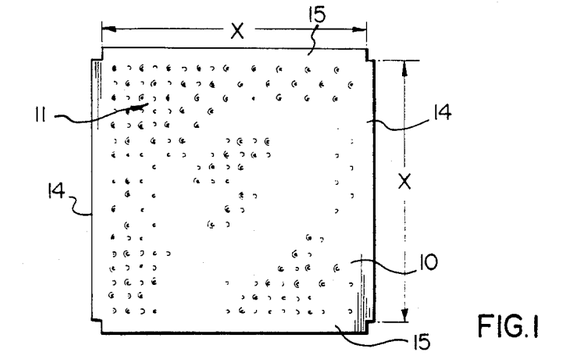
FIG. 1 is a plan view of a sheet for use in a heat exchanger core.

The heat exchanger core is made up of a series of comparatively thin sheets of a suitable metallic material having good thermal conducting properties, preferably aluminum. Except for the end sheets which will be planar, each sheet will preferably be formed with an array of oppositely directed nodules. FIG. 1 shows such a sheet 10 formed with nodules 11.

Figure 2:
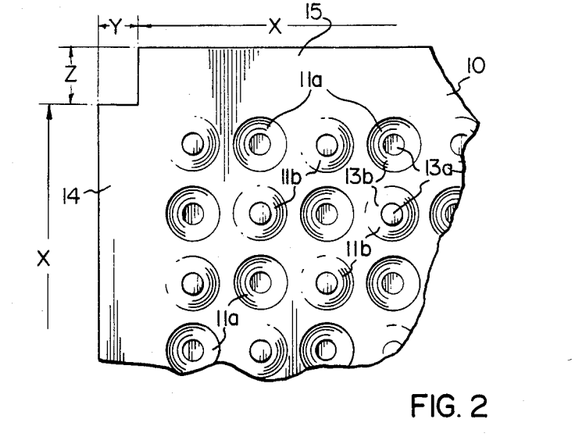
FIG. 2 is an enlarged fragment of the sheet of FIG. 1.
Figure 3:
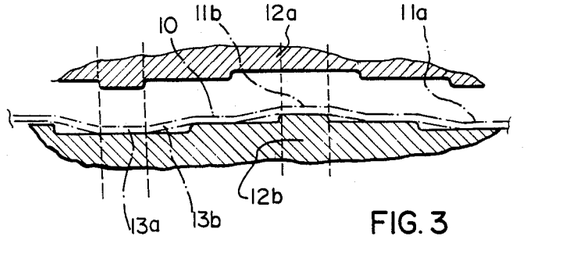
FIG. 3 is a fragmentary view of a pair of dies illustrating how such a sheet can be made.
Figure 4:
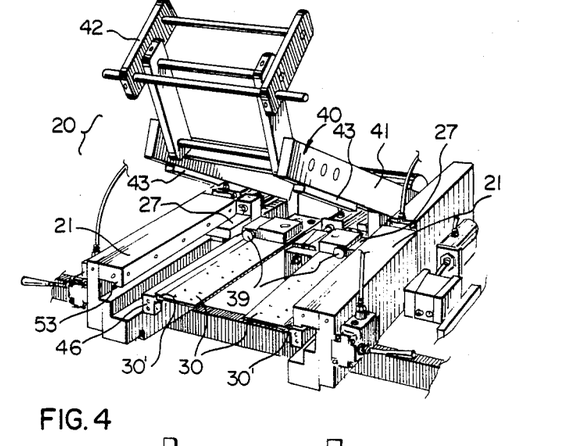
FIG. 4 is a perspective view of the main working parts of a machine for constructing a core from a series of such sheets.

As shown in FIG. 3, which illustrates fragments of a pair of dies 12a and 12b for forming such a sheet 10, nodules 11a project in one direction out of the plane of the sheet, while nodules 11b extend oppositely. FIG. 2 shows how these nodules 11a and 11b are arrayed alternately in rows and columns. While the exact shape and arrangement of these nodules can vary, it is convenient to make them by the dies 12a, 12b which will produce for each nodule a convenient central circular portion 13a surrounded by a frusto-conical portion 13b.

The main body of the sheet 10 is square, the distances X in FIG. 1 being equal to each other. In addition, the sheets 10 include peripherally projecting flanges 14 and 15 of unequal dimensions Y and Z respectively. The plane sheets 10' (FIG. 9), for use at the ends of the core, are provided with the larger flanges 15 but not with the smaller flanges 14. In practice, of course, all the sheets are stamped out of stock by dies (not shown) that simply remove the corner pieces of metal.

FIGS. 4, 5, 6A and 6B illustrate a machine 20 for forming heat exchanger cores from a series of such sheets. For simplicity the bed plate of the machine has been mostly omitted, only the main working parts being shown. The machine is symmetrical about a front to rear centre line and hence only the right hand side will be described in detail.

Extending along each side of the machine 20 there is a forming block slide assembly 21 that is pivoted to the bed plate about a vertical axis 22 at the rear of the machine. Rotation of the slide assembly 21 about the axis 22 in the two directions indicated by the arrows A is controlled principally by a fluid operated, e.g. pneumatic, cylinder 23 that moves a wedge element 24 between a fixed member 25 and an inclined surface 26 secured to the assembly 21. The assembly 21 acts as a slide for front to back travel of a forming block 27 that carries a forming tool 28 later to be described in detail. Travel of the block 27 is controlled by the piston of a fluid operated cylinder 29.

Figure 6A:
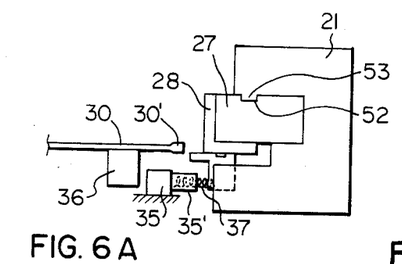
FIG. 6A is a diagrammatic end view of one side of the machine, taken on the line 6A—6A in FIG. 5, but with the parts in a relaxed condition.

An inside mandrel 30 is pivoted to the bed plate about a vertical axis 31 for limited movement in the directions of arrows B and can be forced in counter-clockwise rotation by a fluid operated cylinder 32 whose piston carries a wedge element 33 engaging an inclined surface 34 secured to the mandrel 30. As best seen in FIG. 6A, beneath the mandrel 30 there is a fixed block 35 secured to the bed plate of the machine. This block acts as a stop for a further block 36 secured to the underside of the mandrel 30.

Figure 5:
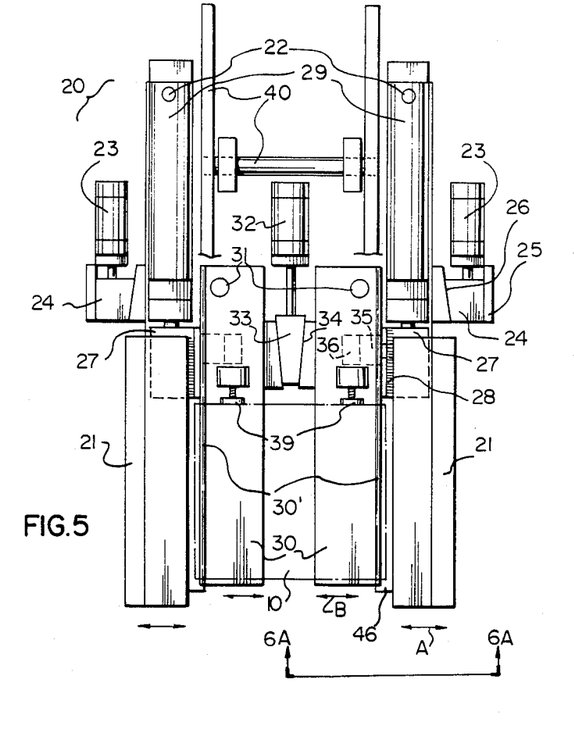
FIG. 5 is a diagrammatic plan view of the main elements of the machine of FIG. 4.

The block 35 also has a projecting portion 35' which acts as a stop for the slide assembly 21 and serves to house a spring 37 that tends to urge the slide assembly away from the block 35, i.e. counter-clockwise about the axis 22. FIG. 6A shows this relaxed condition, while FIGS. 5 and 6B show the clamped condition achieved when the cylinders 23 and 32 are actuated and both the slide assembly 21 and the inner mandrel 30 are pressed firmly against the block 35 (35').

With the machine parts in the relaxed condition, the operator slides a first pair of sheets horizontally into the machine, one above and one below the mandrel 30. As shown in FIG. 5, this inward movement is limited by stops 39 located both above and below the mandrel 30.

Since an end of a core is about to be formed, the lower sheet is a plain sheet 10' and the upper one is a noduled sheet 10, a flange 15 of the lower sheet 10' and a flange 14 of the upper sheet 10 projecting beyond an enlargement 30' that forms the edge of the mandrel 30 into a work area.

Figures 6B, 9, 12, 13:
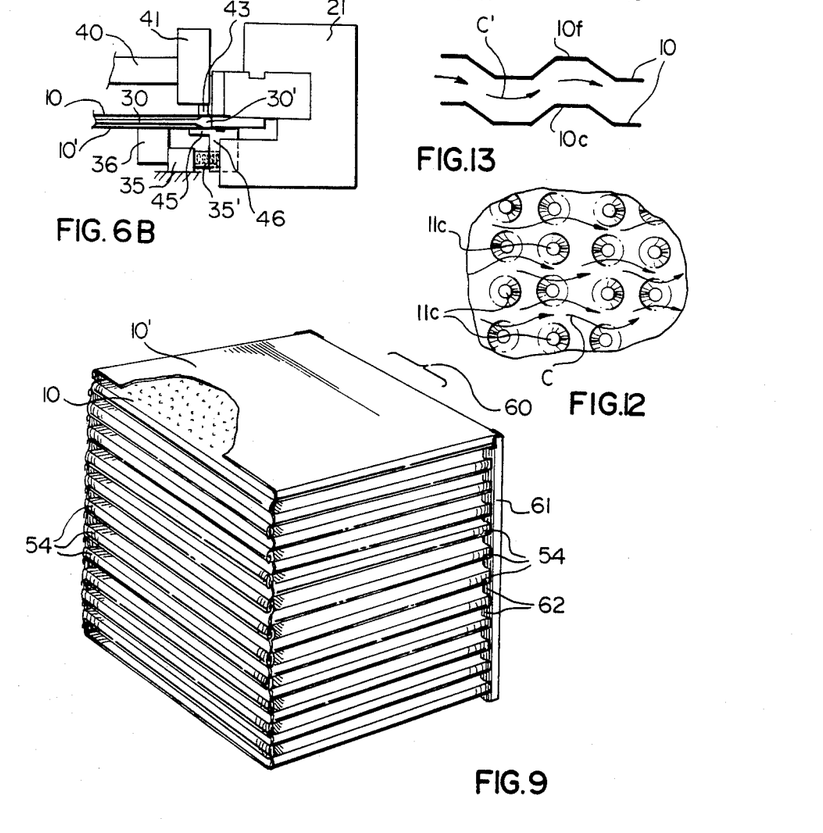
FIG. 6B corresponds to FIG. 6A with the parts in a clamped position.
FIG. 9 is an almost completed core.
FIG. 12 is a diagram taken on the line 12—12 in FIG. 11.
FIG. 13 shows an alternative to FIG. 11.

The cylinders 23 and 32 are then operated to move the parts to the clamped position of FIG. 6B and a top hold down frame 40 is lowered and clamped in place. Most details of this frame have been omitted, since it is conventional, but, as can be seen from FIG. 4, it consists essentially of a pair of main arms 41 pivoted at the rear of the machine about a horizontal axis and a toggle mechanism 42 whereby the frame can be readily manually moved to, and locked in, a hold down position. In this hold down position a bar 43 on the underside of each arm 41 presses down on the upper sheet 10 immediately above the mandrel enlargement 30' to hold the sheets 10 and 10' firmly down in the work position. On its underside the lower sheet 10' is supported by a lip 45 of a bottom mandrel 46 that extends along the slide assembly 21.

Consideration will now be given to the nature of the tool 28 which is shown in detail in FIGS. 7A to 7D. This tool consists of two parts, a side forming die 50 and a bottom forming die 51 both mounted in the forming block 27.

The side forming die 50 has a leading, steeply inclined, underside surface 50a followed by a less steeply inclined, underside surface 50b and a sideways inclined, side surface 50c. At the rear of the surface 50b it is formed with a straight groove 50d along its edge nearer the bottom forming die 51. The inclined surface 50b leads into a straight undersurface 50e extending beside the groove 50d.

Figures 7A, 7B, 7C, 7D:
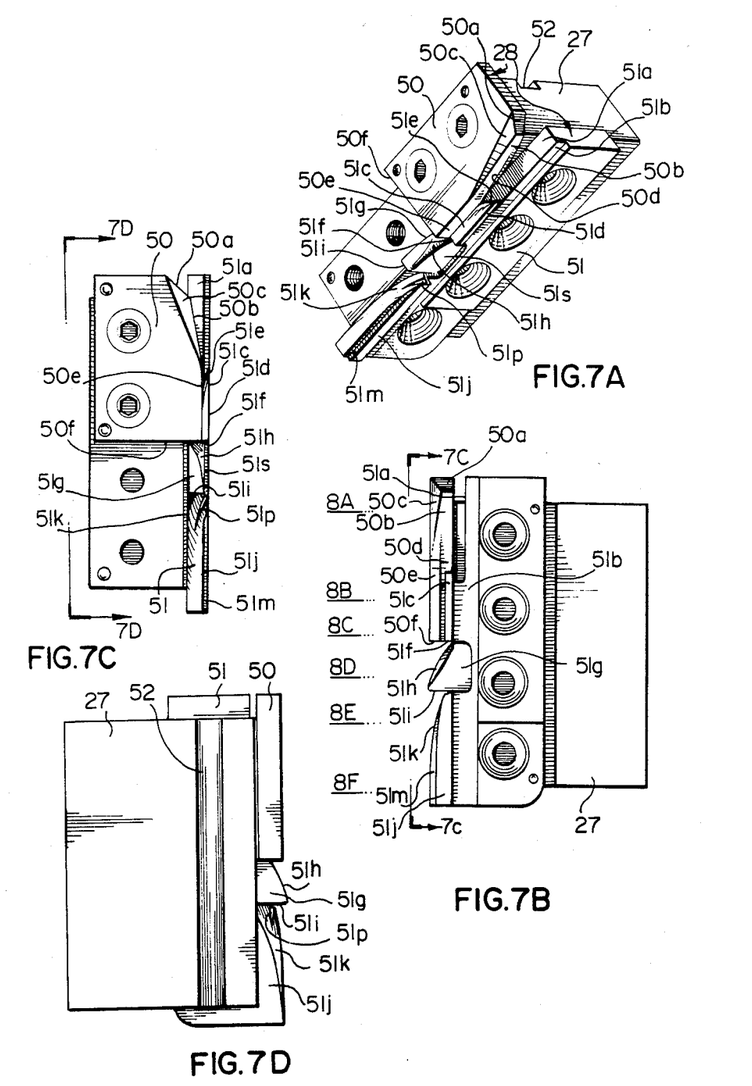
FIG. 7A is an underside perspective view of a tool employed in the machine of FIG. 5.
FIG. 7B is an underside view of the tool as seen looking from the right hand side of FIG. 7A.
FIG. 7C is a side view taken on 7C—7C in FIG. 7B.
FIG. 7D is a rear view taken on 7D—7D in FIG. 7C.

The bottom forming die 51 has a plane leading surface 51a extending along a side edge and a groove 51b in its undersurface. Approximately in alignment with the trailing edge of the surface 50b of the side forming die 50, the bottom forming die 51 has a sharp, forwardly projecting ramp 51c whose undersurface 51d is straight but whose upper surface 51e inclines rearwardly outwardly and upwardly. The ramp 51c ends at a location 51f in alignment with the trailing edge 50f of the side forming die 50. Immediately rearwardly of the ramp end 51f, the bottom forming die 51 has a projection 51g that serves to present a rearwardly outwardly and downwardly inclined surface 51h, the degree of downward inclination of this surface 51h diminishing to zero by the time it reaches the trailing edge 51i of the projection 51g. The projection 51g has a flat undersurface 51s that, as can be seen from FIG. 7C is raised slightly above the upper level of the groove 51b. Rearwardly of the projection 51g the bottom forming die 51 has a further projection 51j that presents a rearwardly outwardly and upwardly inclined surface 51k formed at its leading edge with a short, shallow groove 51p. In addition, the projection 51j has a straight groove 51m in its outer undersurface.

It will be noted that the upper surface of the forming block that supports the tool 28 (dies 50 and 51 collectively) has a groove 52 that engages a corresponding track 53 on the undersurface of the upper part of the slide assembly 21.

The effect of advancing the tool 28 from rear to front, i.e. into the work area, with a pair of sheets clamped in position as shown in FIG. 6B is shown in the series of diagrams of FIGS. 8A to 8F. The sections on which these views are taken relative to the part of the tool 28 responsible for each action are identified by corresponding numbers in FIG. 7B. In fact, of course, the flanges 14 and 15 are folded progressively as the tool moves towards the front of the machine.

Figures 8A, 8B, 8C, 8D, 8E, 8F:
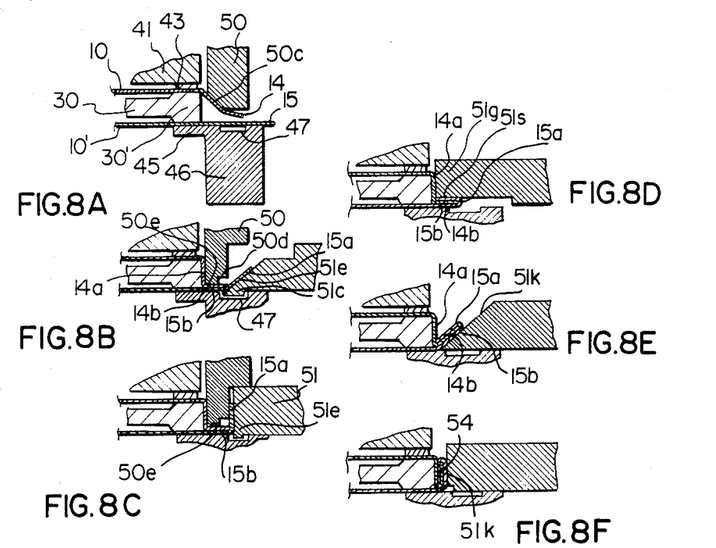
FIGS. 8A to 8F are a series of end views showing successive actions of the tool in operation of the machine.

FIG. 8A shows the initial effect of the surface 50c of the side forming die 50 in bending the flange 14 of the sheet 10.

FIG. 8B shows the situation a moment later when the flange 14 has been bent by the die surface 50e into inner and outer portions 14a, 14b that are at right angles to each other. The surface 51e of the ramp 51c of the bottom forming die 51, sliding in a groove 47 of the bottom mandrel 46, has also started to bend up an outer portion 15a at the edge of the flange 15, while leaving an inner portion 15b of this flange flatly underlying the flange portion 14b.

FIG. 8C shows the situation at line 8C in FIG. 7B, i.e. just before the trailing edge 51f of the ramp 51c and the aligned trailing edge 50f of the side forming die 50 are reached. By this time the die 51 has bent the flange portion 15a fully at right angles to the portion 15b.

FIG. 8D shows the result of passing beyond the trailing edge 50f of the side forming die 50 and the action of the projection 51g of the bottom forming die 51 in folding the flange portion 15a over and down on top of the flange portions 14b and 15b, to form an assembly in which the outer portion 14b is sandwiched between the portions 15a and 15b.

FIG. 8E shows how the surface 51k of the projection 51j then bends this assembly upwardly until the vertical position shown in FIG. 8F is eventually reached, namely a completed substantially air tight fold of the flanges, referred to below as a lap joint 54.

When a pair of such lap joints 54 has thus been formed on opposite sides of a pair of sheets 10, 10', the hold down frame 40 is released and raised, and the cylinders 23 and 32 are retracted to allow the slide assemblies 21 and the mandrels 30 to move to the relaxed condition, the cylinders 29 are retracted to withdraw the tools 28, thus enabling the operator to slide the now-joined pair of sheets forwardly and off the mandrels 30. He then turns this pair of sheets through 90° about a vertical axis and reinserts it into the machine except that the sheet 10, which was formerly above the mandrels 30, is now immediately below them. The 90° turn thus brings the larger flanges 15 of this sheet 10 into the working area of the tools 28. The operator also inserts another noduled sheet 10 into the machine above the mandrels 30 with its smaller flanges 14 to the side, i.e. in the working area. Thus these flanges 14 and 15 bear the same relationship to each other as did the flanges 14 and 15 of the first pair of sheets, and reactivation of the tools 28, after first bringing the slide assemblies 21, mandrels 30 and hold down frame 40 to the clamped position, will form another pair of lap joints 54, this time between the second and third sheets.

Figures 10A, 10B:
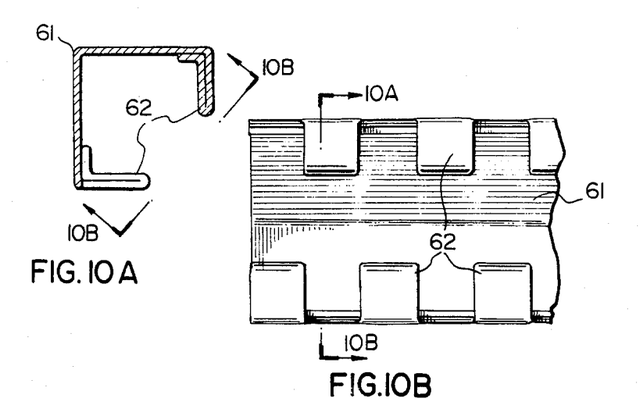
FIG. 10A is an end view of a corner piece of such core as seen at 10A—10A in FIG. 10B.
FIG. 10B is a section on 10B—10B in FIG. 10A.

This procedure is repeated to build up a series of sheets interconnected along their opposite edges by air tight lap joints 54, the pairs of edges so joined alternating down the stack. The result is a core 60 providing one set of air passages extending from front right to rear left and another set extending from front left to rear right as seen in FIG. 9, each such set of air passages being isolated from the other, except that they are in close thermal contact through the thin aluminum sheets between them. To maintain the correct spacing between the sheets each corner of the core 60 is completed by means of a corner post 61 which, as shown in FIGS. 10A and 10B, is an elongated, angled section of aluminum with two arms carrying rows of teeth 62 staggered so as to enter between alternate pairs of sheets.

Figure 11:
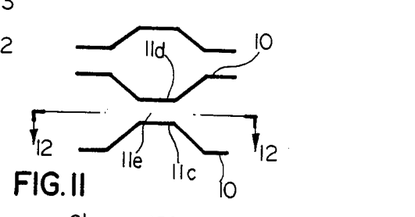
FIG. 11 is a diagram illustrating from the side one manner of constructing the core.

FIGS. 11, 12 and 13 illustrate two alternative ways of arranging the sheets 10. If they are placed with upwardly projecting nodules 11c on one sheet 10 aligned with downwardly projecting nodules 11d on the sheet 10 above, then the effect will be to divert the air flow around the constrictions 11e thus formed, as demonstrated by the arrows C in FIG. 12. Alternatively, if upwardly projecting nodules 11c on one sheet 10 are aligned with upwardly projecting nodules 10f on the sheet above, as in FIG. 13, the undulations of the air flow $C^1$ tend to be in a plane perpendicular to the sheets 10, in contrast to FIGS. 11 and 12 where they are more parallel to the planes of the sheets. In either case the effect is to create some turbulence and break up boundary layers in the air flow, hence increasing heat transfer between the air and the sheets.

Figure 14:
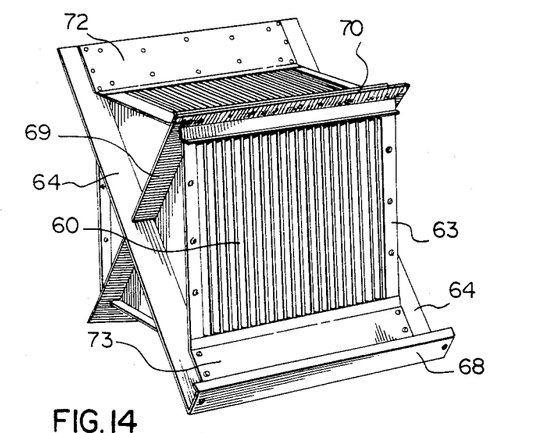
FIG. 14 is a perspective view showing the core mounted in a frame.
Figure 15:
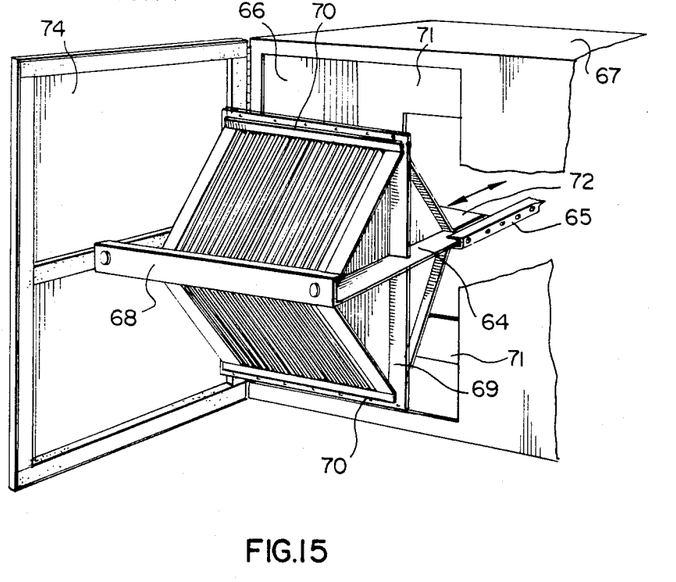
FIG. 15 is a cut-away perspective view showing the manner in which this frame can be engaged in a housing of a heat exchanger.

The core 60 is rigidly mounted in a frame 63 (FIGS. 14 and 15) that includes side flanges 64 whereby the assembly can be slidingly received in and supported by a pair of U-tracks 65 extending from front to rear in a lefthand compartment 66 of a heat exchanger housing 67. The frame 63 includes a bent up front edge 68 that acts as a handle for inserting and removing the core assembly from the housing. In addition, the frame 63 includes vertical side flanges 69 and top and bottom horizontal flanges 70 that effectively extend around the entire frame as a peripheral border. When the core assembly is in position in the housing, these flanges 69, 70 engage corresponding flanges 71 projecting inwardly from the walls of the compartment 66 to form a border around the opening for receiving the frame 63.

Figure 16A:
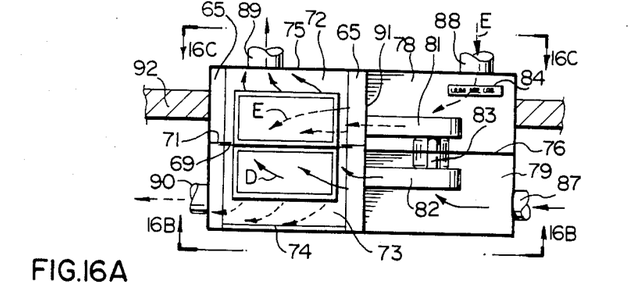
FIG. 16A is a plan view of such a heat exchanger, illustrated diagrammatically and with the top of the housing removed to show the internal parts.
Figure 16B:
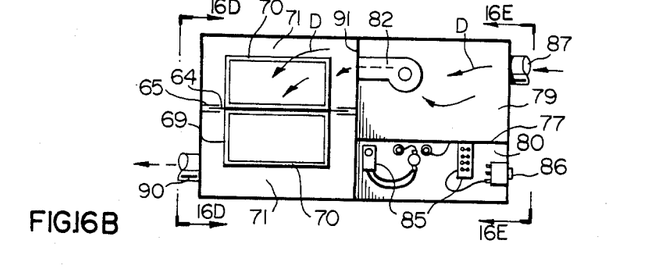
FIGS. 16B and 16C are similar front and back views with the outer housing panels largely cut away, taken respectively on lines 16B—16B and 16C—16C in FIG. 16A.
Figure 16C:
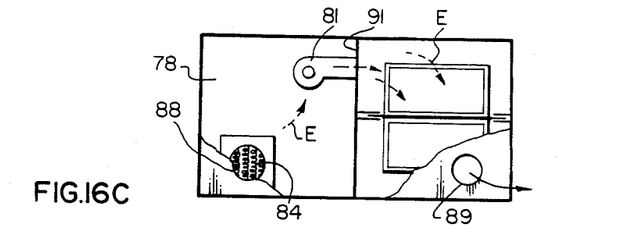
Figure 16D:
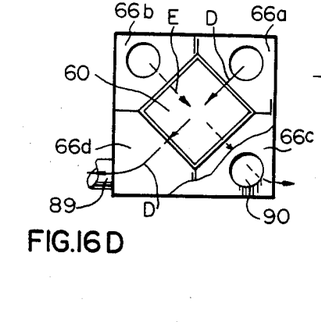
FIGS. 16D and 16E are similar end views taken respectively on lines 16D—16D and 16E—16E in FIG. 16B, the outer housing panel being partly cut away in FIG. 16D.
Figure 16E:
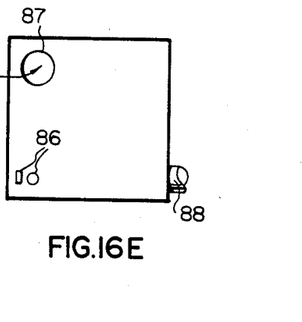

The effect of this arrangement is perhaps best appreciated from the diagrammatic representatives of the interior of the housing 67 provided by FIG. 16A which sees it from above, FIG. 16B which sees it from the front and FIG. 16D which sees it from the left hand end. The engagement of flanges 64 and tracks 65 will be sufficiently air tight taken together with the front and rear shelves 73, 72 which respectively abut the closed door 74 and rear panel 75 of the housing to divide the compartment 66 between top and bottom, while the cooperating flanges 69, 70 and 71 similarly divide it from front to rear. Hence four chambers are formed 66a (upper front), 66b (upper rear), 66c (lower front) and 66d (lower rear).

The right hand compartment of the housing 67 is divided by a fixed vertical panel 76 and a fixed horizontal panel 77 into a rear chamber 78, an upper front chamber 79 and a lower front chamber 80. Fans 81 and 82 powered by a common motor 83 are located in chambers 78 and 79 respectively. Chamber 78 also houses an electric heater 84 and chamber 80 contains circuit elements 85 connected to external controls 86 and to a thermostat (not shown) sensing the temperature of the fresh air entering the building. Ports 87, 88, 89 and 90 are shown communicating with chambers 79, 78, 66d and 66c respectively.

Stale air from the building (represented by solid arrows D) will be drawn by the fan 82 through the port 87 into the chamber 79 and hence discharged by this fan through the main dividing panel 91 between the left and right compartments of the housing into the upper front chamber 66a. From here it passes through one set of air passages in the heat exchange core 60 to the lower rear chamber 66d and out of the port 89. Fresh air from the exterior of the house (represented by broken arrows E) is drawn by the fan 81 through the port 88 and over the preheater 84 into the chamber 78, and is discharged through the panel 91 into the upper rear chamber 66b. From here it passes through the other set of air passages in the heat exchange core to the lower front chamber 66c and out of the port 90. It will be noted that the two ports 88 and 89 that are required to communicate with the exterior of the building, to bring in fresh air and expel stale air, respectively, are arranged at the rear of the housing 67 so that the latter can conveniently be mounted in a wall 92 of the building. The ports 87 and 90 for removing stale air from, and supplying fresh air to, the building, are located at forward locations in respective ends of the housing.

Figure 17A:
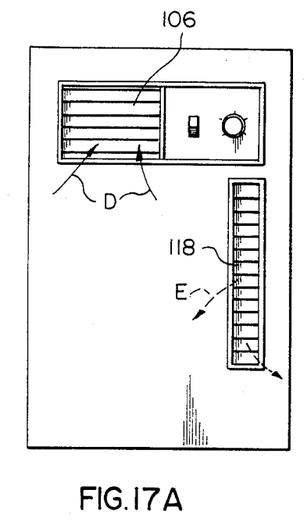
FIG. 17A is a front view of an alternative construction of heat exchanger.
Figure 17B:
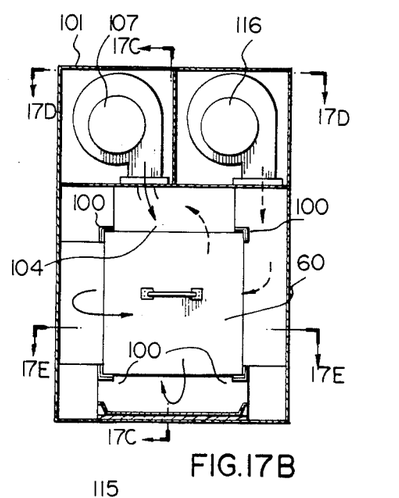
FIG. 17B is the construction of FIG. 17A substantially with the front panel removed.
Figure 17C:
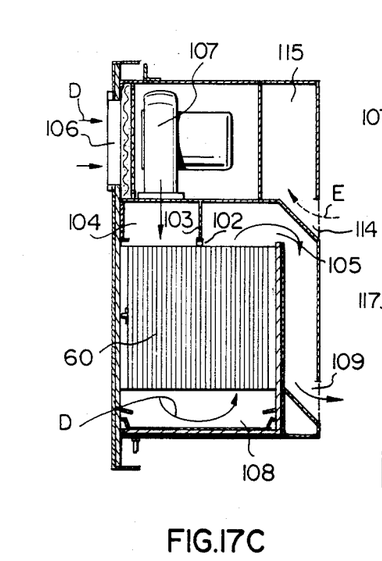
FIGS. 17C, 17D and 17E are respectively sections on lines 17C—17C, 17D—17D and 17E—17E in FIG. 17B.
Figure 17D:
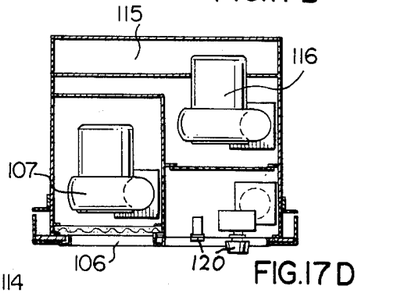

An alternative embodiment is illustrated in FIGS. 17A to 17E. In this instance the core 60 requires no frame, although one can be provided if desired. It is shown in FIG. 17B with its four corner posts 61 arranged to slide in tracks 100 extending from front to rear in a housing 101. When in position as shown in FIG. 17C, the top edge of the core 60 is contacted by a flexible gasket 102 on the lower edge of a panel 103 that divides the upper part of the housing in the front to rear direction into a front chamber 104 and a rear chamber 105. Stale air D drawn into the housing through a port 106 by a fan 107 is forced into the chamber 104 and downwardly through the forward half of one set of air passages in the core 60 into a lower chamber 108, from where it flows upwardly through the rear half of the same set of air passages to the chamber 105 and hence out of a port 109 at the rear of the housing 101 to the exterior of the building.

Figure 17E:
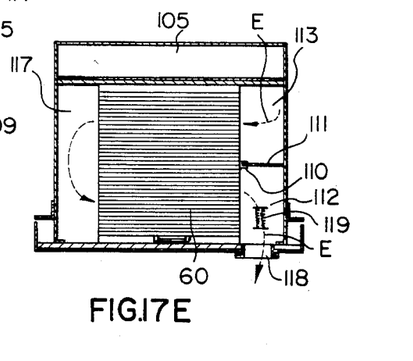

In a like manner, as shown in FIG. 17E, a side edge of the core 60 is contacted by a flexible gasket 110 on the vertical edge of a panel 111 that divides the right hand side of the housing 101 in the front to rear direction into a front chamber 112 and a rear chamber 113. Fresh air E drawn into the housing through a port 114 into a chamber 115 is driven by a fan 116 into the rear side chamber 113. From here it passes horizontally through the rear half of the second set of air passages in the core 60 into a left hand chamber 117, from where it flows back horizontally to the right through the front half of this second set of air passages to the chamber 112 and out of a port 118 into the building.

Thus, the core 60 serves as two heat exchangers in series, although this effect is achieved without the need to have two cores. A first "higher temperature" exchanger, which consists of the front half of the core 60, takes in stale building air at a temperature T1, discharging it at a lower temperature T2. A second "lower temperature" exchanger, which consists of the rear half of the core 60, takes in this partly cooled air at temperature T2 and discharges it to the exterior of the building at a still lower temperature T3. The cold incoming fresh air, on the other hand, comes in at a temperature T4 and is heated by the second exchanger to a temperature of T5 and subsequently by the first exchanger to a temperature T6. The maximum temperature drop across the first exchanger is this T1−T5 and that across the second exchanger is T2−T4. Each of these temperature drops is less than the total difference T1−T4 between the inside and the outside air. This is an important advantage, because this total temperature difference is the main factor determining the necessary amount of preheating of the outside air. When the outside air is below 0° C., heat exchangers of the present type can be expected to experience the formation of frost arising from moisture in the stale house air that is subjected to a freezing temperature, and it is to avoid this problem that preheaters, such as the heater 84, are provided. Generally speaking, the greater the total temperature difference across such a heat exchanger, the more the preheating required to prevent the formation of frost sufficient to impair the operation of the device. Hence, by effectively dividing the core 60 into two heat exchangers and providing counter flow so that an upstream portion of one flow is in heat exchange relationship with a downstream portion of the other flow, and vice versa, each heat exchange relationship has a drop less than the total temperature difference. The result is a reduction in the need for preheating. If the device needs to be equipped to handle the most extreme climatic conditions, say below −20° C., a preheater (not shown) can nevertheless be provided, if desired, but its capacity can be comparatively small and its utilisation can be expected to be relatively infrequent.

As an alternative or an addition to the use of a preheater that contacts the incoming cold air, either of the embodiments described above can include a make up heater located to heat the incoming air but on the downstream (warm) side of the heat exchanger. Such a make up heater is shown at 119 in FIG. 17E which also shows controls 120.

I claim:

1. In a method for forming a heat exchange core from thin metallic sheets having edge flanges projecting peripherally therefrom, a procedure for joining a pair of such sheets together in spaced apart, parallel, aligned orientation by forming joints from flanges of said pair of sheets along a pair of opposite edges thereof, said procedure comprising
   (a) clamping each pair of sheet edges to be joined against top and bottom surfaces of a mandrel located between said edges with the flanges projecting in spaced, parallel planes beyond an edge surface of the mandrel into a work area; and
   (b) moving a series of tool surfaces along each said work area in the longitudinal direction of said sheet edges;
   (c) the leading tool surfaces acting to bend a first flange so that an inner portion thereof is bent to lie at right angles to the sheets against the edge surface of the mandrel and an outer portion thereof lies parallel to and against an inner portion of the second flange;
   (d) the subsequent tool surfaces acting to bend an outer portion of the second flange around the end of the outer portion of the first flange to lie against such outer portion of the first flange and hence form an assembly in which said outer portion of the first flange is sandwiched between the two portions of the second flange;
   (e) the final tool surfaces acting to bend such assembly to lie against the inner portion of the first flange and thus complete a substantially air tight joint that is mechanically interlocked against relative movement of the sheets in both directions transverse to the direction of extent of such joint; and
   (f) withdrawing from the mandrel the pair of sheets thus joined together along a pair of opposite edges.

2. A method according to claim 1, including clamping one of said pair of sheets with each of its unjoined edges and one of a pair of opposite edges of a third sheet against the top and bottom surfaces of said mandrel with the flanges of such clamped edges projecting into a work area, and repeating steps (b) to (e) on said flanges to form a substantially air-tight joint therefrom.

3. A method according to claim 2, including repeating the formation of said joints with successive pairs of flanges of successive sheets to build up a stack of such sheets uniformly spaced from each other to form a core having two sets of alternating air passages extending through the core perpendicularly to each other, and mounting a post on each corner of the core to extend perpendicular to the sheets, said post having two arms perpendicular to each other for closely embracing and closing such corner.

4. A method according to claim 3, wherein each post has a series of projecting teeth extending along an edge of each arm to engage a corresponding series of spaces between adjacent sheets, the teeth on one arm being staggered in relation to those on the other arm.

5. A method according to claim 1, including
   (g) rotating this pair of sheets ninety degrees about an axis perpendicular to the planes of the sheets;
   (h) clamping one of said pair of sheets with each of its unjoined edges and one of a pair of opposite edges of a third sheet against the top and bottom surfaces of said mandrel with the flanges of such positioned edges projecting into a said work area; and
   (i) repeating steps (b) to (e).

6. A method according to claim 5, including repeating steps (f) to (i) with successive sheets to build up a stack of such sheets to form a core having two sets of air passages extending through the core perpendicularly to each other.

7. A method according to claim 1, wherein said step of moving a series of tool surfaces along each work area comprises moving a block having a series of non-rotating tool surfaces along each said work area.

8. A machine for forming a heat exchange core from thin metallic sheets having edge flanges projecting peripherally therefrom, said machine comprising on each side thereof
   (a) an elongated inner mandrel for receiving on opposite surfaces thereof a pair of sheet edges to be joined in spaced apart, parallel, aligned orientation with their flanges projecting beyond an edge of the mandrel into a work area;
   (b) an elongated slide assembly extending generally parallel to said inner mandrel and including a bottom mandrel;
   (c) tool means slidably mounted in said slide assembly;
   (d) means for holding said inner mandrel and said slide assembly in a clamped condition with the bottom mandrel aligned with said inner mandrel;
   (e) means for clamping one of said pair of sheet edges against one of said inner mandrel surfaces and the other of said sheet edges between the other inner mandrel surface and the bottom mandrel with said flanges projecting into the work area;
   (f) means for moving said tool means along said slide assembly through said work area;
   (g) said tool means including first surfaces shaped for bending a first flange at right angles to cause an inner portion thereof to lie against the edge of the mandrel and an outer portion thereof to lie parallel to and against an inner portion of the second flange, second surfaces shaped for bending an outer portion of the second flange around the end of the outer portion of the first flange to lie against such outer portion of the first flange and form an assembly in which said outer portion of the first flange is sandwiched between the two portions of the second flange and further surfaces shaped for bending said assembly to lie against the inner portion of the first flange and thus complete a substantially air tight joint that is mechanically interlocked against relative movement of the sheets in both directions transverse to the direction of extent of such joint.

* * * * *